United States Patent
Chen

(10) Patent No.: US 8,689,830 B2
(45) Date of Patent: Apr. 8, 2014

(54) SPIN CONTROLLED FAUCET OUTLET STRUCTURE

(75) Inventor: Chi-Chuan Chen, Lu Kang Township, Changhua County (TW)

(73) Assignee: Chuan Wei Metal Co., Ltd., Changhua County (TW)

( * ) Notice: Subject to any disclaimer, the term of this patent is extended or adjusted under 35 U.S.C. 154(b) by 299 days.

(21) Appl. No.: 13/186,909

(22) Filed: Jul. 20, 2011

(65) Prior Publication Data

US 2013/0019975 A1 Jan. 24, 2013

(51) Int. Cl.
*F16K 3/08* (2006.01)
*E03C 1/084* (2006.01)
*E03C 1/086* (2006.01)

(52) U.S. Cl.
USPC ..................................... 137/625.31; 251/208

(58) Field of Classification Search
CPC ....... F16K 11/074; E03C 1/04; E03C 1/0404; E03C 1/08; E03C 1/084
USPC ............... 137/454.5, 625.28, 625.31, 625.32, 137/625.44, 625.45, 801; 239/428.5, 569, 239/581.1, 590; 251/205, 208, 340, 341, 251/345
See application file for complete search history.

(56) References Cited

U.S. PATENT DOCUMENTS

| | | | | |
|---|---|---|---|---|
| 4,530,467 A * | 7/1985 | Bueno | | 239/407 |
| 6,412,710 B1 * | 7/2002 | Lin et al. | | 239/436 |
| 7,322,535 B2 * | 1/2008 | Erdely | | 239/581.1 |
| 7,494,074 B2 * | 2/2009 | Benstead | | 239/449 |
| 7,766,259 B2 * | 8/2010 | Feith et al. | | 239/391 |
| 8,109,449 B2 * | 2/2012 | Weis et al. | | 239/428.5 |
| 2006/0016001 A1 * | 1/2006 | Zhao | | 4/675 |

* cited by examiner

*Primary Examiner* — John K Fristoe, Jr.
*Assistant Examiner* — Frederick D Soski

(57) ABSTRACT

This invention provides the design of a spin-controlled faucet outlet structure. It contains a valve seat inside a rotation set. The valve seat houses a turn button, a scaling plate and a discharging plate. These three pieces are locked together and controlled on the valve seat through a bridging seat. The bridging seat is locked to the faucet outlet. The turn button and the sealing plate along with the turn button and the rotation set move in series. The bottom of the rotation set is connected to a bubbler. The turn button of the rotation set spins with the sealing plate together and changes the blockage of the faucet outlet using the sealing plate, making it function as the controller of discharging and stopping water.

8 Claims, 6 Drawing Sheets

SPIN CONTROLLED FAUCET OUTLET STRUCTURE

FIELD OF THE INVENTION

This invention is about the design of a spin-controlled faucet outlet structure. Traditional water-saving valves employ pressure control mechanism for water discharge and stop at the faucet outlet, causing safety concerns about hand burning. In the current design, a spin control method is employed to control the water discharge and stop, avoid the direct contact between water and hands, safety level is enhanced. Due to the adaption of précised ceramic valves, water leakage problem as a result of long time usage is avoided, better practical usability and safety is thus obtained.

Different types of faucet valves are available commercially, among which the most popular one is made by the US company, 3M, which has very high market share. These valves mainly use the bolt body at the center of the valve to set pressure on the built-in valve sheet, change its position and thus control the tap out and sealing of water. Although it is very convenient to use, the water flow directly contacts with hand if pressure is applied on the bolt body because this bolt body lies at the center of the outflow. Under such condition, if the mixing rate of cold and hot water is in the high temperature regime, hot water flushes the bolt body, causing the burning of hand. Thus, it is necessary to seek solutions to treat this problem.

On the other hand, voltage-controlled valves only control water flow and sealing; they don't control the flow rate. Thus, if different flow rate is needed, one still need water control knob to adjust, causing inconvenience. Furthermore, the built-in valves may wear off after long time usage, water leakage may happen, potentially affecting its life and practical value. This is another reason for the improvement.

BRIEF SUMMARY OF THE INVENTION

The main purpose of this invention is to control the water flow at the faucet outlet via new structure design; thus to avoid water flush bolt body and burn the hand.

The second purpose of this invention is to control the water flow and sealing at the faucet outlet via new structure design, more importantly, to control water flow rate directly, making it more practical.

The third purpose of the invention is to make water control more accurate and free of leakage by using precision ceramic valves, which also extend their service life.

| | |
|---|---|
| (10) rotation set | (11) rib pattern |
| (12) capacity slot | (13) step edge |
| (14) water hole | (15) screw |
| (16) external (male) screw threaded segment | (20) valve seat |
| (21) expanded diameter section | (22) necking section |
| (23) 24) sealing ring | (25) through slot |
| (26) water hole | (27) embedded slot |
| (28) internal (female) screw threaded segment | (30) turn button |
| (31) reduced diameter section | (32) screw segment |
| (321) embedded slot | (33) C-type ring |
| (34) groove connection | (35) fitting slot |
| (40) sealing plate | (41) (42) open slot |
| (43) embedded fitting slot | (50) discharging plate |
| (51) (52) water hole | (53) convex embedded block |
| (60) bridging seat | (61) locking piece |
| (62) locking piece | (63) internal chamber |
| (64) water inlet | (65) (66) sealing gasket |
| (67) sealing plate | (70) faucet |
| (71) outlet | (72) bubbler |

DETAILED DESCRIPTION OF THE INVENTION

Figure 1:
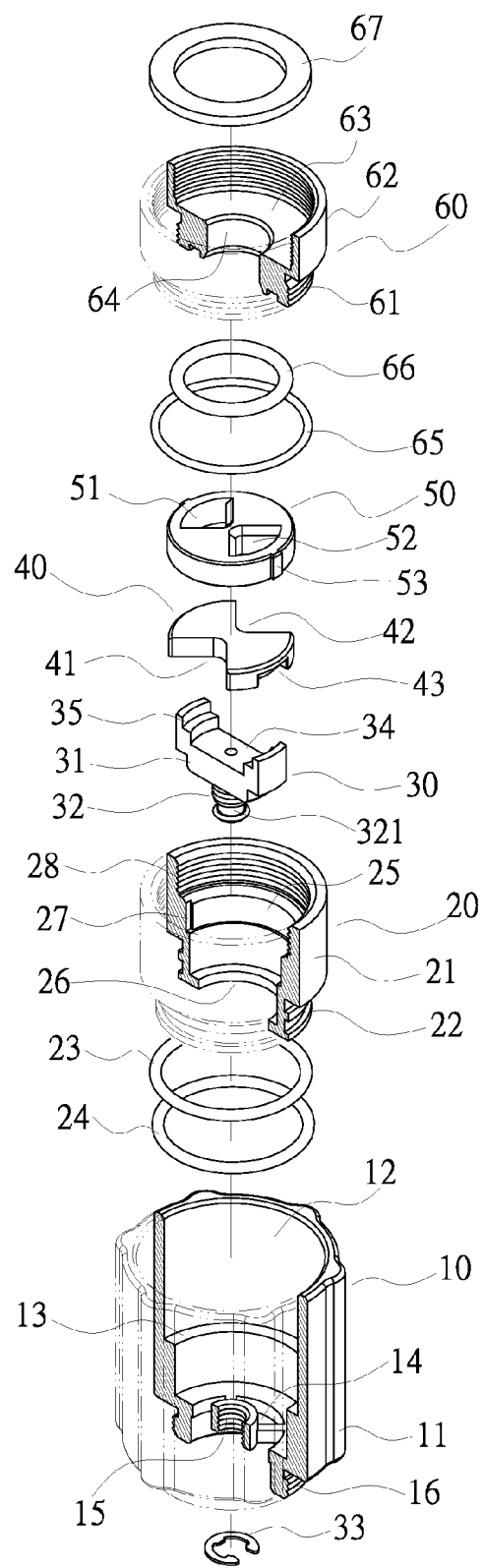
FIG. 1: The structural decomposition diagram of the new design.
Figure 2:
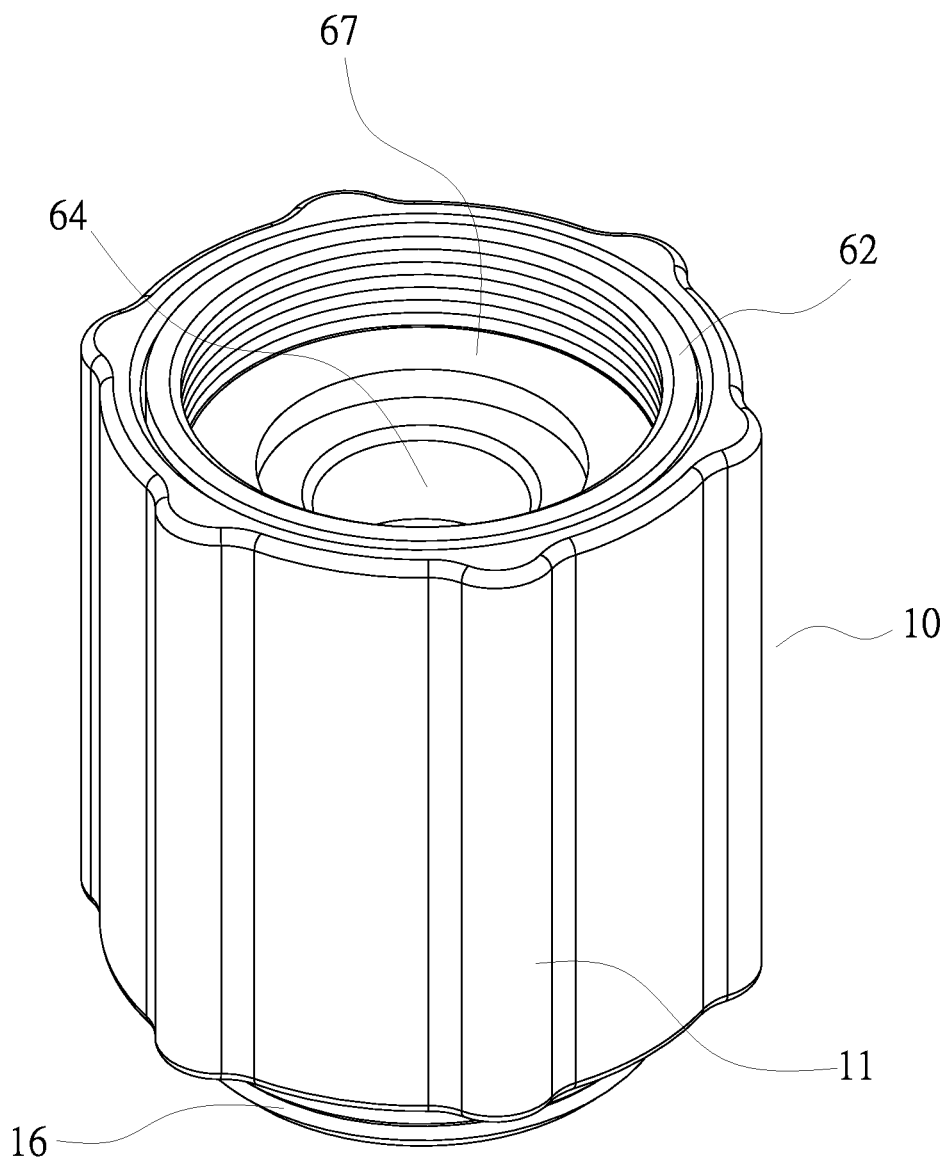
FIG. 2: The structural schematic of the new design.
Figure 4:
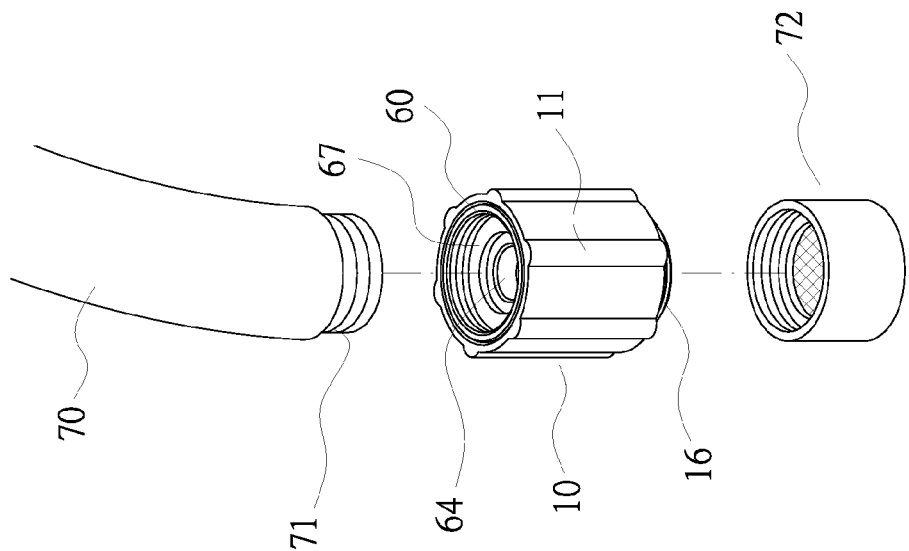
FIG. 4: Blow-out schematic for the implementation of the new design.
Figure 3:
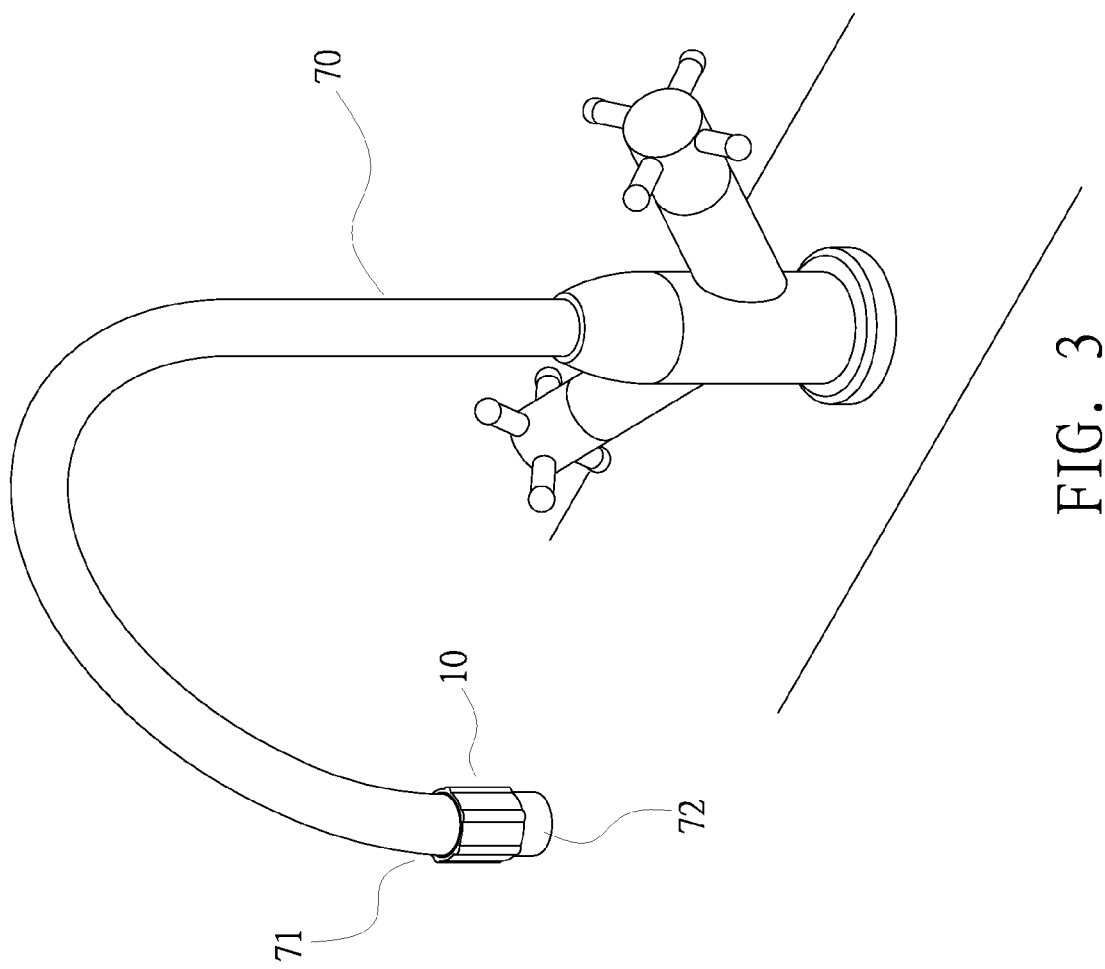
FIG. 3: Schematic for the implementation of the new design.
Figure 6:
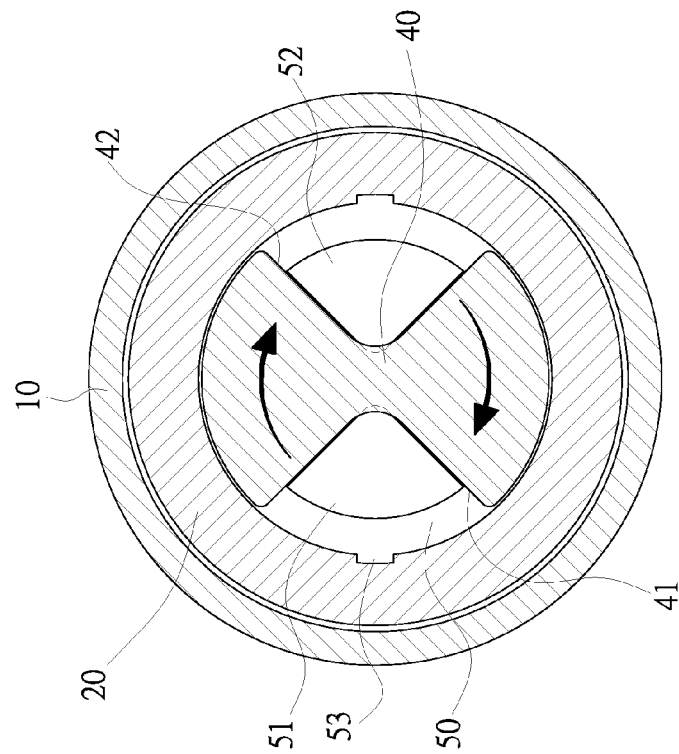
FIG. 6: Structural relationship diagram under water outflow condition viewed from a different angle.
Figure 5:
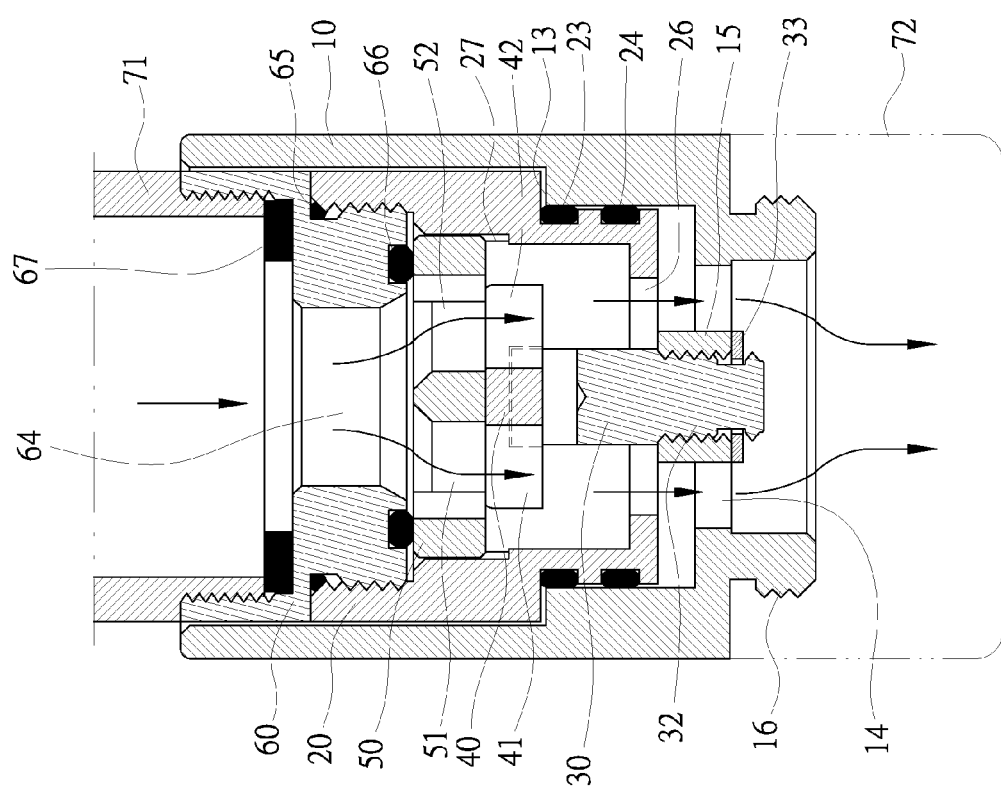
FIG. 5: Structural relationship diagram under water outflow condition.
Figures 7, 8:
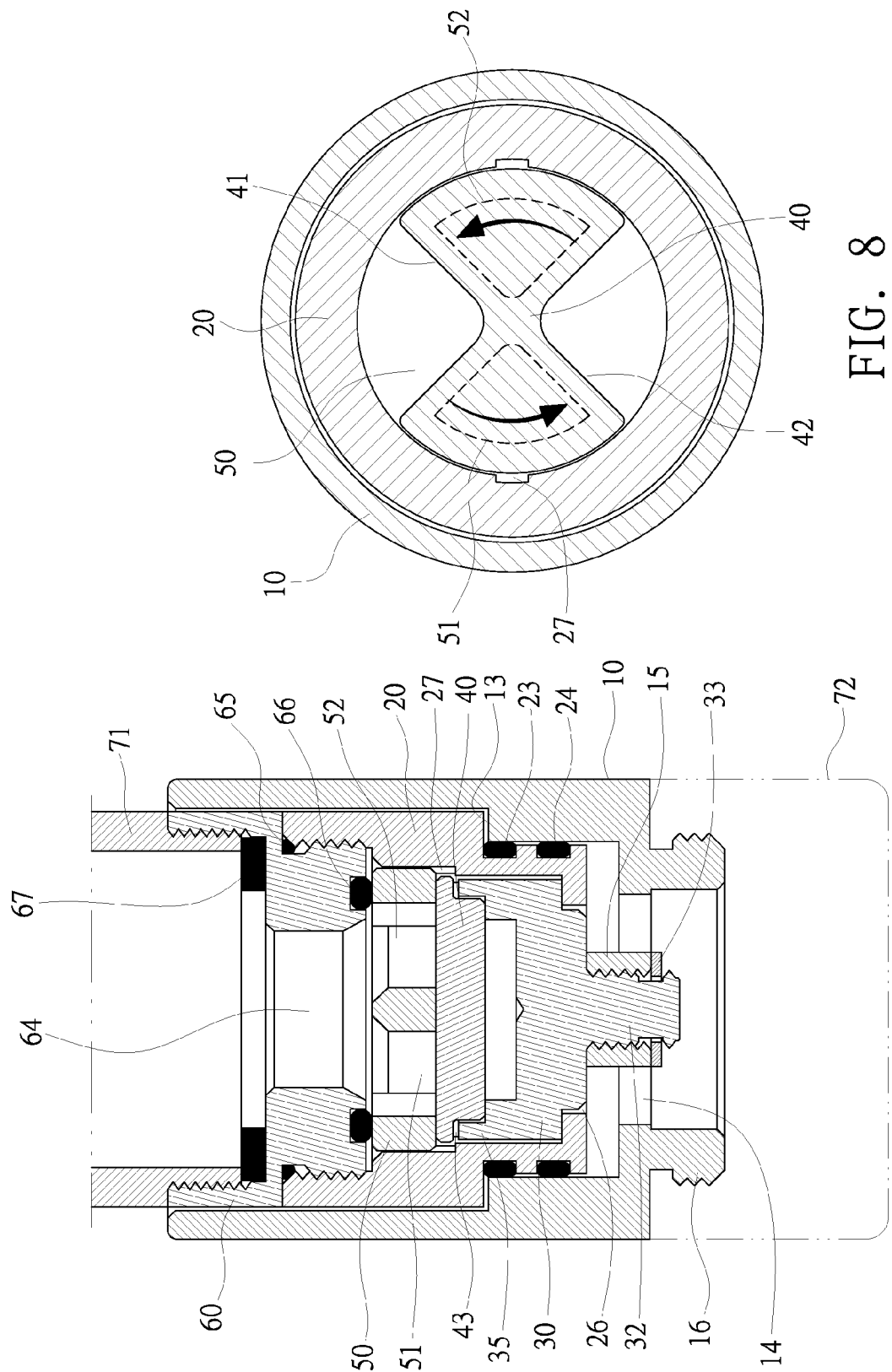
FIG. 7: Structural relationship diagram under water sealing.
FIG. 8: Structural relationship diagram under water sealing condition viewed from a different angle.

For the structure of this new faucet outlet design, its techniques and functions, please refer to the Figures attached, which will be discussed in detail later in this document. FIG. 1 is the structural decomposition diagram; FIG. 2 describes the assembled structure; FIG. 3 is the schematic diagram of the structural relationship; FIGS. 4 and 5 are about the implementation of the new faucet outlet under spinning state; and FIGS. 6 to 9 are the schematic diagram of the structural relations in motion, describing the best running condition. As shown in these figures, this new facet outlet include at least:

The rotation set (10), its outer edge is made with non-planar rib pattern (11) to facilitate hand-held rotary control. Inside the rotation set (10), there is a two-step capacity slot (12) which provides space for filling the valve seat (20) of another set as well as related components. The step edge (13) on the inside wall is used to set up the position of the valve seat (20), while several water holes (14) are made at the capacity slot (12) bottom for water out flow. At the center a screw (15) is used to make the built-in turn button (30) of the valve seat (20) to move with the screw together. At the lower part of the rotation set (10), an external male screw threaded segment (16) is made to connect with marked available bubbler (72) (due to generic reason, part of the schema is illustrated as imagine).

The valve seat (20) has a two-stage diameter, with the outer diameter of its upper section (21) matching the inner diameter of the upper part of the capacity slot (12) of the rotation set (10), while the outer diameter of the lower necking section (22) is slightly smaller than the inner diameter of the lower part of the capacity slot (12) of the rotation set (10). Sealing rings (23) (24) with predetermined number are put along the outer surface of this smaller diameter necking section (22), so that when the valve seat is set into the capacity slot (12) of the rotation set (10), the position is exactly set by the above mentioned step edge (13), meanwhile, the sealing rings (23) (24) make the valve seat (20) and the rotation set (10) watertight. Inside the valve seat (20), a multi-diameter through slot (25) is made. A water channel (26) with smaller diameter is formed at the bottom of this through slot (25). A turn button (30) and a sealing plate (40) are set in the smaller diameter section of the through slot (25), making the water hole (26) of the turn button (30) be screwed together with rotation sleeve (10). A discharging plate (50) is placed at the medium-diameter section of the through slot (25). Its inner surface are embedded with one pair of slots (27) to fix the position of this discharging plate (50), making it not to rotate. At the upper section of the through slot (25), internal screw threads are made, so that it is connected to the bridging seat (60) and the turn button (30), the sealing plate (40) and the discharging plate (50) are systemically formed together as a water control unit.

The turn button (30), is a ⊔ type body. Its lower part has a reduced diameter section (31) whose dimension matches the inner diameter of the water hole (26) at the bottom of the valve seat (20), making it fit inside the water hole (26). There is a screw segment (32) from the bottom of the reduced diameter section(31) which is screwed into the through hole (25) at the center of the slot (12) bottom of the rotation set (10) and fastened to the embedded slot (321) at the lower part of the screw segment (32) using a C-type ring (33). Thus rotation set (10) and the turn button (30) move in series. The top of the turn button (30) is made as step-shaped groove connection (34), the both sides of which are made as fitting slot (35), and connected to the sealing plate (40), making it move with turn button (30) together.

The sealing plate (40), can be precision ceramic products, made from a disc and cut into funnel-shaped through two symmetrical triangle-shaped open slots (41) (42). Along the section of the disc other than the two open slots (41) (42), embedded fitting slot (43) are made to fit the aforementioned fitting slot (35) of the turn button (30). Thus, the sealing plate (40) is connected to the top of the turn button (30), the sealing plate (40) is then controlled by the turn button (30).

Discharging plate (50), is a disc-type precision ceramic products, which has two symmetrically located triangular orifice water holes (51) (52). A pair of convex embedded blocks (53) are attached on its outer edge. Thus, if being placed into the through slot (25) of the valve seat (20), the convex embedded blocks fit into the embedded slot (27) on the inner surface of the through slot (25) of the valve seat (20). The discharging plate (50) and the valve seat (20) thus connect together, without rotating the discharging plate.

Figure 9:
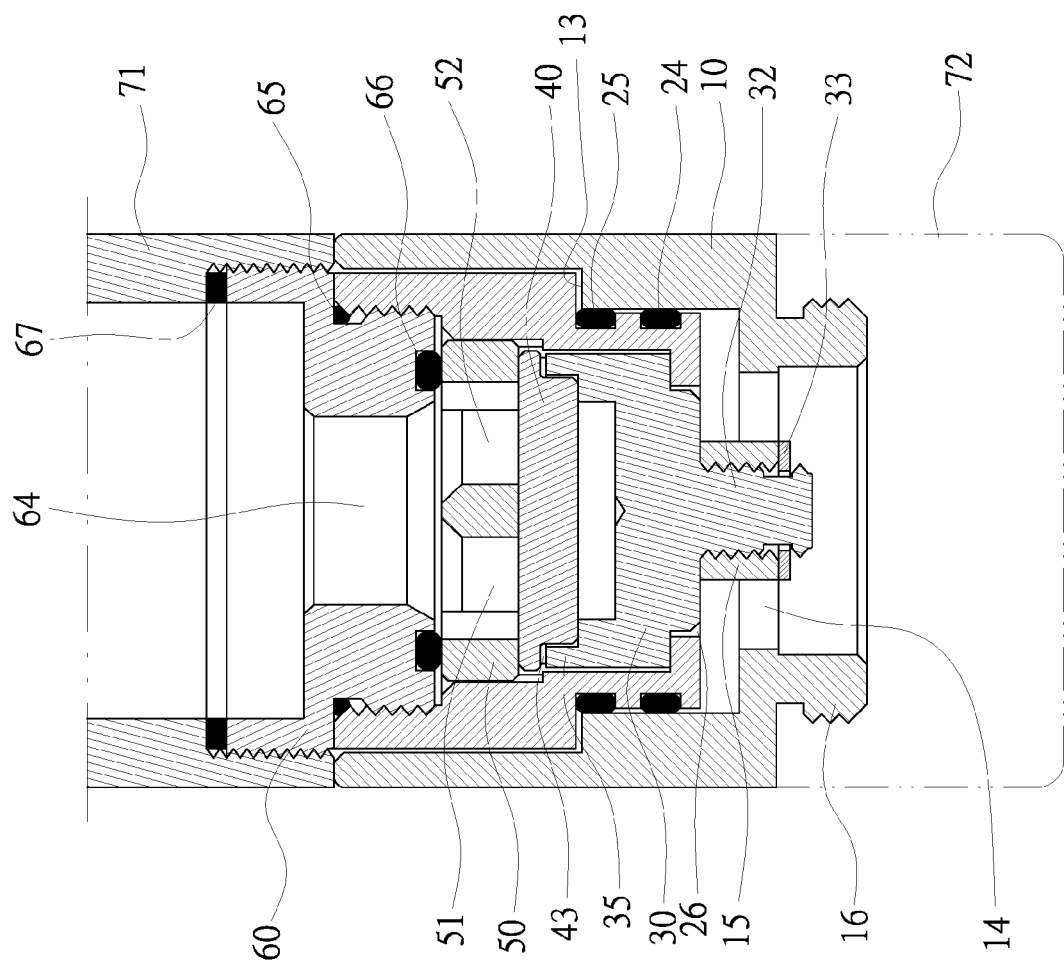
FIG. 9: Schematic for another implementation of the new design.

Bridging seat (60), the bottom part of it has locking piece (61) whose dimension matches the diameter of the female screw threaded segment (28) at the upper part of the through slot (25) of the valve seat (20). At the outer edge as well as the bottom of locking piece (61), there are embedded sealing gasket (65) (66), making it locked to the top of the valve seat (20) and fixing the positions of the water control components including the discharging plate (50), sealing plate (40) and turn button (30), so that the aforementioned valve pieces and valve seat (20) are connected. The top of the bridging seat is made as a locking piece that can be locked to the faucet (70) outlet (71). The outer diameter of this locking piece matches the inner diameter of the capacity slot (12) of the rotation sets (10), and it can be made as either female (as shown in FIGS. 1-8) or male (as shown in FIG. 9) screw thread depending the type of screw thread of the faucet (70) outlet (71). Thus, it is directly connected to the faucet (70) outlet (71). If the locking piece is designed to have male screw thread, the length of the capacity slot (12) of the rotation set (10) needs to be shortened. So that the male screw thread section of the locking piece (62) can be exposed to the outside of the rotation set (10), making it easier to be connected to the faucet (70) outlet (71). Meanwhile, at the bottom of the internal chamber (63) of the locking piece (62), there is a water inlet (64). A sealing plate (67) is placed in the internal chamber (63), making it watertight while being connected to the faucet (70) outlet (71).

Accordingly, the faucet outlet based on the aforementioned design, one uses the rotation of the rotation set (10) to make the turn button (30) and the sealing plate (40) rotate simultaneously, and thus change the relative position between the triangle open slots (41) (42) of the sealing plate (40) and the triangle water holes (51) (52) of the discharging plate (50). When the open slots (41) (42) completely face the water holes (51) (52), maximal water flow rate is obtained; when the open slots (41) (42) partially cover the water holes (51) (52), water flow rate is decreased, and when the open slots (41) (42) completely cover the water holes (51) (52), water flow is stopped completely. Thus, one does not need to control the water flow by operating the control handle of the faucet (70), instead, by rotating the rotation set (10),' one can easily control the water flow as well as flow rate. Since the setup is at the faucet (70) outlet (71), there is no need to hold water by hand to rinse the faucet control handle, as that happens for traditional water faucet, and thus eliminate the problem of wet muddy surroundings and related health and safety issues, making it more practical and convenient compared with existing water valves. Furthermore, since no direct contact with the faucet outlet is needed during the operation, one avoids the risk of water instantaneously flushing hand and related hand burning issues. In addition, since the water control components such as the sealing plate (40) and discharging plate (50) are made of precision ceramic products, there is no issue of wear and fatigue as observed in regular water valves. The service lite of the water control piece is effectively extended and water leakage problem is avoided. Overall, it has more practical value of application.

In summary, this invention provide a new design of the faucet outlet, which regulates the water flow and stop using spin controlled mechanism and is capable of adjusting the water flow rate. Since water does not directly contact hand during the operation, safety issues related to the hand burning due to the high water temperature is avoided. The use of precision ceramic products for the control pieces also eliminates the problem of water leakage. Overall, it treats the problems of the existing similar products, having more practical value, is truly a superior and novel design. We thus apply for patent protection of it.

I claim:

1. A spin-controlled faucet structure coupling with a water hole, comprising:
   a rotation set having a two-step capacity slot inside hosting a valve housing, wherein an inside wall of the two-step capacity slot is used to set up the position of the valve housing and a plurality of holes are located at a bottom of said two-step capacity slot for water to flow; wherein the two-step capacity slot has a first and second inner diameter with the first inner diameter being larger than the second inner diameter;
   the valve housing having an outer diameter, an inner diameter and a lower necking section, wherein the outer diameter is larger than a diameter of the lower necking section, wherein the outer diameter of the valve housing matches the first inner diameter of the two-step capacity slot, and wherein the diameter of the lower necking section of the valve housing is slightly smaller than the second inner diameter of the of the two-step capacity slot and wherein a plurality of sealing rings are placed along with the lower necking section to provide a watertight coupling between the rotation set and the valve housing, wherein a multidiameter through slot having a smaller diameter formed at a bottom of the through slot, wherein the inner diameter of the valve housing further comprises a female screw section;

a water control unit, residing inside of the valve housing wherein the multidiameter through slot is coupled to the rotation set and the water control unit to control water flow;

a bridge seat having a male screw threaded section matched to the female screw section of the inner diameter of the valve housing so that the valve housing and the water control unit are connected together and a top part of the bridge seat is connected to a faucet; wherein the bridge seat is coupled to an outlet of the faucet, and wherein by rotating the rotation set, the water control unit controls the water flow of the faucet.

2. The spin-controlled faucet according to claim 1, wherein the water control unit further comprises:

a turn button, having a U shaped body and a reduced diameter section of the turn button that matches the inner diameter of a water channel in the valve housing, wherein a bottom of a necking section having a screw threaded extension which is screwed into a screw hole at the center of the slot bottom of the rotation set and a top of the turn button having a step-shaped groove connection connecting to a sealing plate;

the-sealing plate, having a disc type shape cut into a funnel-shape through two symmetrical triangle-shape open slots, the sealing plate, other than the two open slots, has an embedded slot which is made to fit a fitting slot of the turn button, wherein the sealing plate connecting to the top of the turn button and the sealing plate is then controlled by the turn button;

a discharging plate having a disc-type shape further comprising two symmetrically located triangular orifices and a pair of convex embedded blocks attached on its outer edge and being placed into the through slot of the valve seat, wherein the convex embedded blocks fit into an embedded groove on an inner surface of the through slot of the valve housing and the discharging plate and the valve housing are connected together wherein the discharging plate does not rotate in relation to the valve housing.

3. The spin-controlled faucet according to claim 1, wherein an outer diameter of a locking piece of the bridging seat matches the first inner diameter of the two step-capacity slot of the rotation set and having female screw thread so that the bridging seat is hidden inside of the rotation set when connected.

4. The spin-controlled faucet according to claim 1, wherein a locking piece of the bridge seat having a male screw thread section is not exposed to the outside of the rotation set when connected.

5. The spin-controlled faucet according to claim 1, wherein a plurality of seal rings are used among the valve housing, the rotation set and other connections for watertight purposes.

6. The spin-controlled faucet according to claim 1, wherein the water control unit is made from precision ceramic material.

7. The spin-controlled faucet according to claim 1, wherein a sealing plate and a discharging plate of the water control unit are made from precision ceramic material.

8. The spin-controlled faucet according to claim 1, wherein a lower part of the rotation set having a male screw thread section where a commercial available bubbler is connected.

* * * * *